April 11, 1961 L. J. LIBOIS ET AL 2,979,571

TELEPHONIC CONCENTRATOR

Filed June 26, 1959 8 Sheets-Sheet 1

INVENTORS
Louis J. Libois & Pierre M. Lucas
Abraham A Saffitz
ATTORNEY

April 11, 1961 L. J. LIBOIS ET AL 2,979,571

TELEPHONIC CONCENTRATOR

Filed June 26, 1959 8 Sheets-Sheet 2

INVENTORS
Louis J. Libois & Pierre M. Lucas
Abraham A. Saffitz
ATTORNEY

INVENTORS
Louis J. Libois & Pierre M. Lucas
Abraham A. Saffitz
ATTORNEY

April 11, 1961 L. J. LIBOIS ET AL 2,979,571

TELEPHONIC CONCENTRATOR

Filed June 26, 1959 8 Sheets-Sheet 4

INVENTORS
Louis J. Libois & Pierre M. Lucas
Abraham A. Saffitz
ATTORNEY

April 11, 1961 L. J. LIBOIS ET AL 2,979,571

TELEPHONIC CONCENTRATOR

Filed June 26, 1959 8 Sheets-Sheet 5

INVENTORS
Louis J. Libois & Pierre M Lucas
Abraham A Saffitz
ATTORNEY

April 11, 1961 L. J. LIBOIS ET AL 2,979,571

TELEPHONIC CONCENTRATOR

Filed June 26, 1959 8 Sheets-Sheet 6

INVENTORS

Louis J. Libois & Pierre M. Lucas

Abraham A. Saffitz

ATTORNEY

April 11, 1961 L. J. LIBOIS ET AL 2,979,571

TELEPHONIC CONCENTRATOR

Filed June 26, 1959 8 Sheets-Sheet 7

INVENTORS
Louis J. Libois & Pierre M. Lucas
Abraham A. Saffitz
ATTORNEY

INVENTORS

Louis J. Libois & Pierre M. Lucas

Abraham A. Saffitz

ATTORNEY

United States Patent Office 2,979,571

Patented Apr. 11, 1961

2,979,571

TELEPHONIC CONCENTRATOR

Louis J. Libois, 5 Rue Georges Sand, Paris, France, and Pierre M. Lucas, 11 Rue Abbe Derry, Issy-les-Moulineaux, France Filed June 26, 1959, Ser. No. 823,078

Claims priority, application France July 26, 1958

5 Claims. (Cl. 179—18)

This invention relates to a telephone traffic concentrator operating in junction with a completely electronic central station and permitting a certain number of subscribers to be connected to this central station by means of a more limited number of trunk lines.

A number of different kinds of telephonic concentrators have previously been proposed. In some, each connection pertaining to an originating or terminating call and each release of a trunk line are controlled from the central station which, in the case of a calling subscriber, receives from the concentrator the identification signal of this calling subscriber, and in the case of a called subscriber supplies to the concentrator the identification signal of this called subscriber and in both cases indicates the trunk line to be taken. As a result, during the connection which is generally effected by means of a rectangular switchboard or matrix of crosspoints, this switchboard is controlled both in the co-ordinate of the incoming subscribers' lines and in the co-ordinate of the outgoing trunks, that is to say the crosspoint is marked on both its line and trunk terminals.

In the other concentrators of the prior art, known as "independent connection concentrators" (see, for example, the U.S. patent application Ser. No. 642,699 [now Patent No. 2,951,907], filed February 27, 1957, in the names of Ch. Marzin, M. Chappey and the second-named of the present applicants for a "Telephone Concentrator"), the subscribers' lines can be connected to the trunks on a random basis and identification of the chosen trunk occurs in a subsequent step. As a consequence, during the connection, the switchboard is operated only on its line terminals which is an advantage.

The concentrator according to the invention is of the independent connection type.

The transmission of the identification signal of a calling subscriber or of an engaged trunk line from the concentrator to the central station and the transmission of the identification signal of a called subscriber or of a trunk line to be released from the central station to the concentrator can be effected by allotting time intervals to the connection or release of different subscribers, each interval being characteristic of one subscriber, in accordance with the known principles of multiplex communication systems of the time modulation type. This solution requires the presence in the concentrator and in the central station of synchronised scanning devices. The synchronism must be ensured by means of synchronizing pulses of a particular waveform.

Each subscriber's line and each trunk can also be characterized by a coded identification signal of the digit series code type. The subscriber's identification signal and the identification signal of the connected trunk are transmitted from the concentrator to the central station in the case of an originating call. The identification signal of a terminating call or the trunk identification signal of a trunk to be released are transmitted from the central station to the concentrator.

The concentrator according to the invention is of the coded connection kind and is therefore an independent connection concentrator coded in accordance with a series code.

The concentrator according to the invention comprises, in known manner, circuits known as gate circuits, associated with each incoming subscriber's line, which enable to be distinguished four states or possible service conditions of the subscriber's line: the subscriber's line is in open loop condition and not connected, closed loop condition and not connected, open loop condition and connected or closed loop condition and connected. The first service condition corresponds to the subscriber's handset being on the hook in idle condition; the second service condition to the subscriber's handset being removed awaiting operation; the third service condition to a called subscriber before he answers or to a calling subscriber during the dialling pulses or to a subscriber who has hung up his handset at the end of a call before the release of his line; and the fourth service condition corresponds to a subscriber during speech communication. In addition, as is also known, the concentrator comprises in association with each trunk line a circuit known as a trunk equipment circuit which enables the marking of the engagement of the trunk line which is effected by the switchboard, and the carrying out of the release. Finally, also in known manner, a signal of a characteristic frequency known as the loop frequency signal is transmitted on the trunk line when it is busy and when the subscriber's line is not in the closed loop condition (the called subscriber not having removed his handset, or the calling subscriber being in the course of dialling, or a subscriber having replaced his handset but the line not being yet released).

The object of the present invention is to provide a concentrator which effects automatically and without external control the connection of any calling subscriber to an idle undesignated trunk and transmits to the central station switching network the identification signal of the calling subscriber and that of the engaged trunk line, which effects, under the control of the central station, the release of a designated trunk from which it receives the identification signal. As a consequence, the coding and decoding devices which make a given subscriber or a given trunk correspond to a given code are devices which must have a double operation: to transmit the identification signal of a marked calling subscriber which they have detected by scanning or of a trunk line engaged at random, in which case they operate in a free-running manner, or to receive from the central station an identification signal of a called subscriber or of a trunk line to be released and to mark this called subscriber in order to connect him or this trunk line in order to release it, in which case they function in a controlled manner.

The concentrator according to the invention utilises coding-decoding circuits which essentially consist of a group or register of binary scalers or bi-stable triggers associated with a decoding matrix known as the decoder or distributor, the whole having a first input called the scaler input which receives recurrent triggering pulses for operation as a binary scaler, a plurality of outputs known as scanning or distribution outputs at which impulses appear in succession when the register is operating as a binary scaler and a plurality of inputs and outputs known as test or control inputs and outputs, by means of which the state of each binary scaler or trigger circuit can be tested without modification, or controlled either to change the state or to confirm it. To simplify the description the word "register" will be used to indicate the unit including the register proper and the associated decoding circuit. More exactly, when the register operates as a scaler, the decoder produces pulses which appear sequentially at different scanning or distribution outputs. When the operation as a scaler is stopped, the application of pulses at the test or control inputs enables to be obtained from the test or control outputs pulses which are characteristic of the state of each trigger circuit by testing it without influencing its state, or to modify the state of each trigger circuit or to confirm it if no modification is necessary.

According to the invention, on the one hand the gate circuits of the subscribers are connected to the horizontal leads of a rectangular switchboard and the trunk equipments are connected to the vertical leads of this switchboard, and on the other hand each gate circuit is connected to the scanning or distribution outputs of a subscribers' register and each trunk equipment is connected to the scanning or distribution outputs of a trunk register. A control and test register has certain of its distribution outputs connected to the test or control inputs of the subscribers' register, other distribution outputs connected to the test or control inputs of the trunk register and finally a last distribution output connected in parallel to the subscribers' gates. The connections between the control and test register and the subscribers' and trunk registers are made through coincidence circuits which receive either potentials representing the state of the trigger circuits (in the case of test operation), or identification pulses arriving from the central station (in the case of control operation).

The apparatus operates in the following manner:

In normal operation, the subscribers' register operates as a scaler and seeks through its scanning outputs a calling line. When such a line is detected, it is immediately connected to a free trunk. The number of the calling subscriber is then registered in the subscribers' register and the number of the connected trunk, transmitted to the trunk register by the trunk equipment of the connected trunk, is registered in this latter register. The operation of the subscribers' register as a scaler then stops (the trunk register never operates as a scaler) and the control and test register starts to operate as a free-running scaler, that is to say under the control of a local generator. It tests the numbers stored in the two registers, that is to say it transmits pulses through the coincidence circuits associated with the trigger circuits of the registers which, on the other hand, receive from the said trigger circuits potentials which are characteristic of their states. As a result, according to the state of the trigger circuits of the subscribers' and trunk registers, the control and test register transmits to the central station successive positive or negative pulses which constitute first the code identification signal of the calling subscriber and then the code identification signal of the connected trunk. Once the code transmission terminates, normal operation of the concentrator is resumed.

If a called subscriber is to be connected, the code identification signal of this subscriber is transmitted from the central station and the control and test register starts to operate as a controlled scaler. It introduces the received code into the subscribers' register through the control inputs of the latter. This register marks the gate circuit of the called subscriber and the control and test register, through its scanning output connected in parallel with all the subscribers' gate circuits, transmits a pulse which causes the connection to be established with a free trunk line. The number of this trunk line is transmitted to the central station as in the case in which the connected subscriber was calling.

If it is desired to release a given trunk, the code identification signal of this trunk is transmitted by the central station and the control and test register starts to operate as a controlled scaler. The control and test register distinguishes the identification signal of a called subscriber to be connected from the identification signal of a trunk line to be released by means of a start pulse which precedes the code pulses and the polarity of which is different in the two cases. The control and test register introduces the received identification signal into the trunk register through the control inputs of the latter. The trunk register transmits a pulse to the corresponding trunk equipment, which effects the release.

The system provided by the present invention can be extended to the case in which the internal matrix of crosspoints of the concentrator comprises two stages of crosspoints, by effecting a connection between the two stages.

The invention will now be described in detail with reference to the accompanying drawings, in which.

Figure 1:
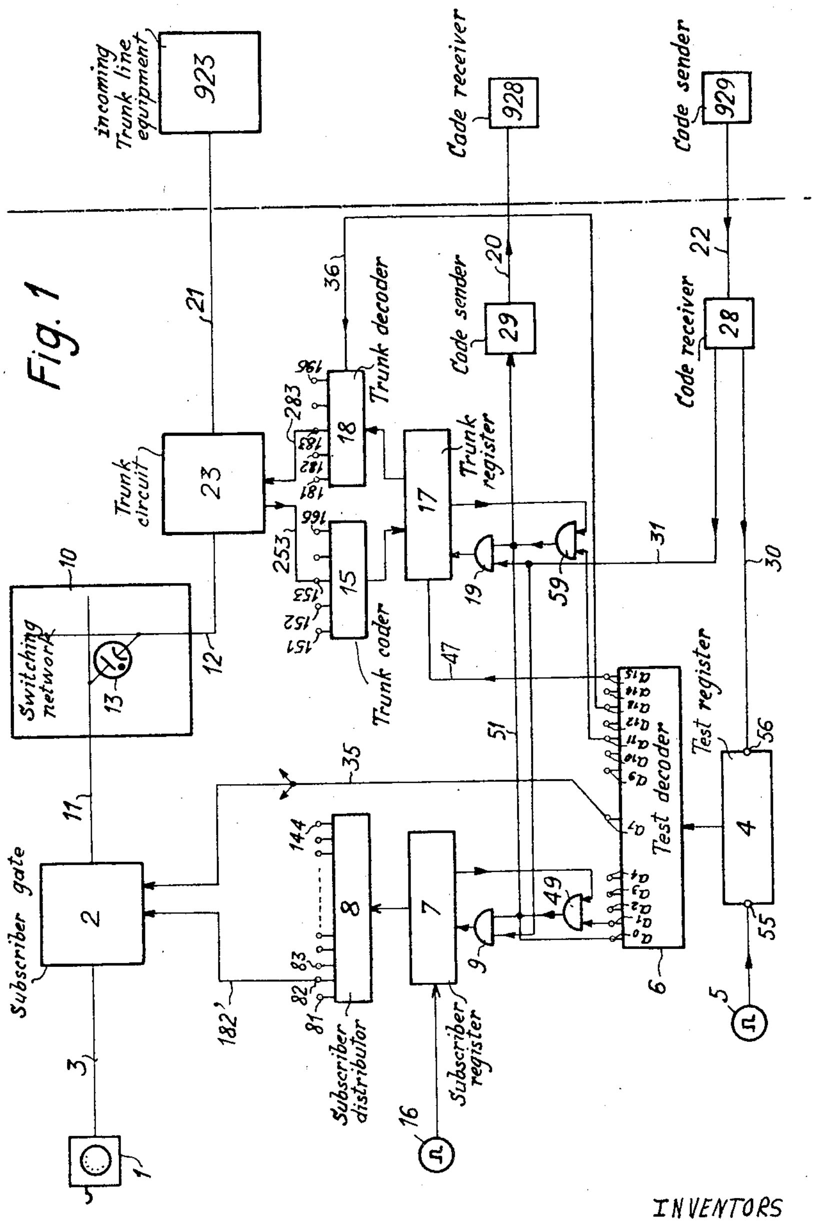
Figure 1 represents a concentrator according to the invention in the form of a block diagram.

Referring to Figure 1, the subscriber's set 1 is connected, through the subscriber's line 3, to the subscriber's gate circuit 2. The gate circuit 2 is connected to the rectangular switchboard or matrix 10 through a lead 11 which is a horizontal lead of this matrix. A trunk equipment 23 is connected to the vertical lead 12 of this matrix. The equipment 23 is itself connected, through a trunk 21, to an incoming line equipment situated in the central station. The switchboard 10 is constituted by a number of crosspoints which may in known manner consist of cold cathode gas-filled tubes, transistors, etc. These crosspoints are indicated by the reference numeral 13.

The subscribers' register includes an actual register 7 and an associated decoder 8. The register includes a number of bi-stable trigger circuits sufficient to ensure that the decoder or distributor 8 has at least as many scanning outputs as there are subscribers connected to the concentrator. In the example described, it has been assumed that there are six trigger circuits 71 to 76 in the register and as a result 64 scanning outputs numbered 81 to 144 in the subscribers' distributor. Each of these scanning outputs is connected to the gate circuit of a subscriber, such as the gate circuit 2, by a lead such as 182'. When the subscribers' register operates as a scaler, it is controlled by a generator 16, and in this case pulses appear in succession at the terminals 81–144.

The trunk register includes an actual register 17, an associated coding circuit 15 and an associated decoding circuit 18. The register comprises a number of trigger circuits sufficient to ensure that the coder 15 and decoder 18 have at least as many outputs (inputs for the coder) as there are trunks connected to the concentrator. In the example described, it has been assumed that there are four trigger circuits 171–174, in the register, and as a consequence there are 16 scanning outputs numbered 181–196 in the trunk decoder and 16 inputs numbered 151–166 in the trunk coder. Each of the inputs 151–166 and each of the outputs 181–196, input and output of the same order, are connected to a trunk equipment 23 through leads such as the leads 253 and 283 respectively.

The control and test register comprises an actual register 4 and an associated decoding circuit 6. The register includes a number of trigger circuits sufficient to ensure that the decoder 6 has at least as many scanning outputs as there are pulses in the identification signal of a subscriber and the identification signal of a trunk when added together. In fact there are provided a number of trigger circuits and a number of scanning outputs greater than the lower limit which has just been described in order to allow the register to control switching operations other than the transmission and reception of identification signals. In the example described, it has been assumed that there are four trigger circuits 41–44 in the register and as a result there are 16 scanning outputs numbered $a_0$ to $a_{15}$ in the control and test distributor. When the control and test register operates as a free-running scaler it is controlled by the generator 5. When it operates as a controlled scaler it receives by way of the conductor 30 the identification pulses transmitted by the identification pulse transmitting device 929 in the central station and relayed by the identification pulse receiving device 28 of the concentrator.

The output $a_0$ of the decoder 6 is directly connected to the lead 51 which goes to the identification signal sender 29 of the concentrator, and is intended to cause the transmission of a start pulse preceding the subscriber's identification pulse. The outputs $a_1$ to $a_6$ are connected to different trigger circuits of the subscribers' register 7 through series-connected gate circuits 49 and 9. The gate circuit 49 receives at its second input a potential representing the state of the corresponding trigger circuit. The output pulse which it provides is applied both to the lead 51 thus providing a digit of the subscriber's identification number and to the gate circuit 9 in the case of reception of a called subscriber's identification signal. The received identification pulses which appear in succession on the lead 31 connected to the identification signal receiver 28 are applied to the second input of the gate circuit 9.

The output $a_7$ of the decoder 6 is connected in parallel by way of the lead 35 to all the subscribers' gate circuits such as the gate circuit 2. The output $a_8$ may be directly connected to the lead 51 which goes to the identification signal sender 29 of the concentrator; the corresponding pulse at the output $a_8$ is then a stop pulse for the subscriber's identification signal and a start pulse for the trunk identification signal.

The outputs $a_9$ to $a_{12}$ are connected to different trigger circuits of the trunk register 17 through series-connected gate circuits 59 and 19. The gate circuit 59 receives at its second input a potential representing the state of the corresponding trigger circuit. The output pulse which it provides is applied both to the lead 51 thus providing a digit of the connected trunk identification number and to the gate circuit 19 in the case of reception of the number of a trunk to be released. The received identification pulses which appear in succession on the conductor 31 connected to the identification signal receiver 28 are applied to the second input of this gate circuit 19.

The output $a_{13}$ of the decoder 6 is connected through the lead 36 to the trunk decoder 18. The output $a_{14}$ is not used and provides a delay before the arrival of the decoder at its output terminal $a_{15}$ which corresponds to a return to the idle condition. This terminal is connected to the trunk register 17 and to other devices which are not shown in Figure 1, and which will be seen in Figure 3.

Details of the operation will be described at the end of the specification. Before proceeding further it can be summarized in the following manner:

The gate of a calling subscriber is marked and when the subscribers' distributor during its scanning operation passes over its terminal corresponding to this gate circuit, the connection is effected. The trunk equipment 23 corresponding to the connected trunk transmits the number of this trunk to the trunk register 17 by way of the trunk coder 15. This number is stored by the trunk register 17. When the connection is made, the subscribers' register stops its scanning and stores the number of the connected calling subscriber. The control and test register then begins its scanning operation and tests through its different scanning outputs the state of the trigger circuits of the registers 7 and 17. The identification signals are then sent through the lead 51, the identification signal sender 29 and the signalling line to the central station.

When a called subscriber is to be connected his identification signal is sent from the central station. It is relayed to the control and test register 4—6 by the identification signal receiver 28. This register operates as a scaler controlled by the identification pulses which it receives through its scaler input 56. The control and test decoder distributes the pulses at its inputs $a_1$ to $a_6$. These pulses arrives at the different gates 9 at the instants when these same gates receive the identification pulses of the called subscriber through the lead 31. The pulses leaving the gate circuits set the trigger circuits of the subscribers' register 7 to the desired condition. The register 7 marks the gate 2 of the called subscriber and the pulse leaving the terminal $a_7$ through the lead 35 effects the connection. The identification signal of the connected trunk is then sent to the central station in the same manner as when the subscriber is calling.

Finally, when a trunk line of given number is to be disconnected, the identification signal of this trunk is sent from the central station with a start pulse which distinguishes it from the identification signals of called subscribers. The control and test register operates as a controlled scaler; the control and test decoder distributes pulses at its outputs $a_9$ to $a_{12}$. The trunk register 17 is set in accordance with the received identification signal. The trunk decoder 18 marks the trunk equipment 23 of the trunk to be disconnected and this latter effects the disconnection. Of course, in this case there is no need for the transmission of an identification signal from the concentrator to the central station.

The subscriber's gate will now be described with reference to Figure 2. The subscriber's line is connected to the first winding of a transformer 201 having three windings. Through the second winding passes the connection current and through the third winding passes the loop frequency current produced by the generator 212.

The call detector 213 serves to detect the presence on the line 3 of the subscriber 1 of the supply current of the microphone at the subscriber's set.

The resistance capacitance circuit 202 enables the detection, with a time constant of suitable value, of the presence of a direct current passing through one of the crosspoints, such as 13, of the matrix of crosspoints 10. The circuit 202 is in series with the second winding of the transformer 201 and with an incoming horizontal lead of the matrix 10. It will be seen that, like all the subscribers' gates in electronic automatic switching units and concentrators, the circuit 2 distinguishes between the looped line and the open line by a given potential at the output of the detector 203, and between the connected line and the unconnected line by a fall of potential at the terminals of the resistance in the circuit 202.

The information obtained in this manner is transmitted to coincidence or gate circuits. There are five coincidence circuits in the gate circuit 2, two of the "and" kind (205 and 206), two of the "and not" kind (204 and 208) and one of the "or" kind (207).

The coincidence circuit 204 allows to pass the subscriber connection pulses produced by the subscribers' register 7 and applied to the lead 182' on condition that it is not inhibited by the presence of a D.C. potential at the terminals of the resistance 202, which potential is transmitted to it by the lead 213.

The coincidence circuits 205 and 206 allow to pass the subscriber connection pulses coming from the coincidence circuit 204. The coincidence circuit 205 allows them to pass when the detector 203 indicates the looping of the subscriber's line. The coincidence circuit 206 allows them to pass when they occur at the same time as a connection pulse coming from the control and test decoder by way of the lead 35 (i.e. in the case of the connection of a called subscriber).

The coincidence circuit 207 collects the connection pulses coming either from the coincidence circuit 205 or from the coincidence circuit 206 and applies them to the connection amplifier 209 which gives them an amplitude sufficient to cause the operation of one of the crosspoints.

The coincidence circuit 208 allows to pass the loop frequency signal coming from the generator 212 when the line is connected (fall of potential at the terminals 202) and not looped (absence of D.C. potential at the output of the call detector 203). As a result the coincidence circuit 208 is operative to pass a signal in the following cases: the subscriber is a calling subscriber and is dialling; the subscriber is a called subscriber and is being rung and has not yet replied; the subscriber has replaced his handset at the end of the conversation and has not yet been released.

A trigger circuit 32, serving for the whole of the concentrator and intended to characterize the phases of transmisison of an identification signal from the concentrator to the central station, is connected to the output of the coincidence circuit 207 in parallel with the switching amplifier 209. This trigger circuit 32 is operated at each connection, both when the subscriber is a calling subscriber (in which case the identification signal of the calling subscriber and that of the connected trunk must be transmited to the central station) and in the case of a called subscriber (in which case the identification signal of the trunk only must be sent to the central station). The operation of this trigger circuit is effected by way of the common lead 211. Its return to idle condition is effected through the lead 47 when the test decoder is in position $a_{15}$.

The trigger circuit 32 serves to stop the scaler operation of the subscribers' register 7 by reducing the potential of the lead 67 when this trigger circuit is brought into operation and to start the generator 5 of the control and test register 4 by removing a blocking potential by way of the coincidence circuit 65.

Figure 1 comprises three units composed of a register and an associated decoder: the control and test register 4 and the control and test decoder 6, the subscribers' register 7 and the subscribers' distributor 8, the trunk register 17 and the trunk decoder 18. As has been stated, these units all operate in the same manner and are particularly described with reference to Figures 3, 4 and 5.

Figures 2, 3:
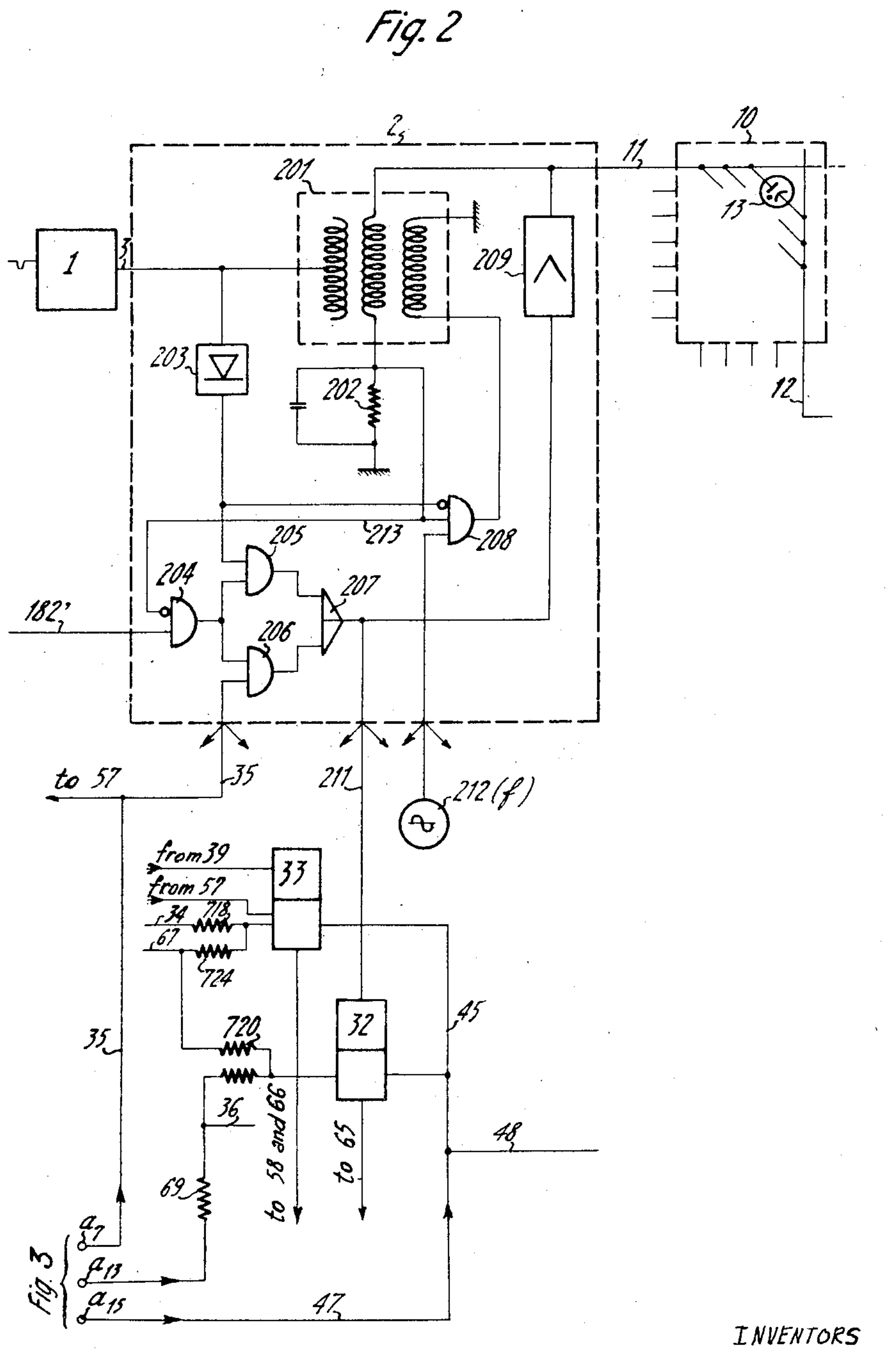
Figure 2 represents the gate circuit of a subscriber.
Figure 3 represents the control and test register, the subscribers' register and the trunk register, their control devices and the circuits which interconnect them or which are associated with them.
Figure 3:
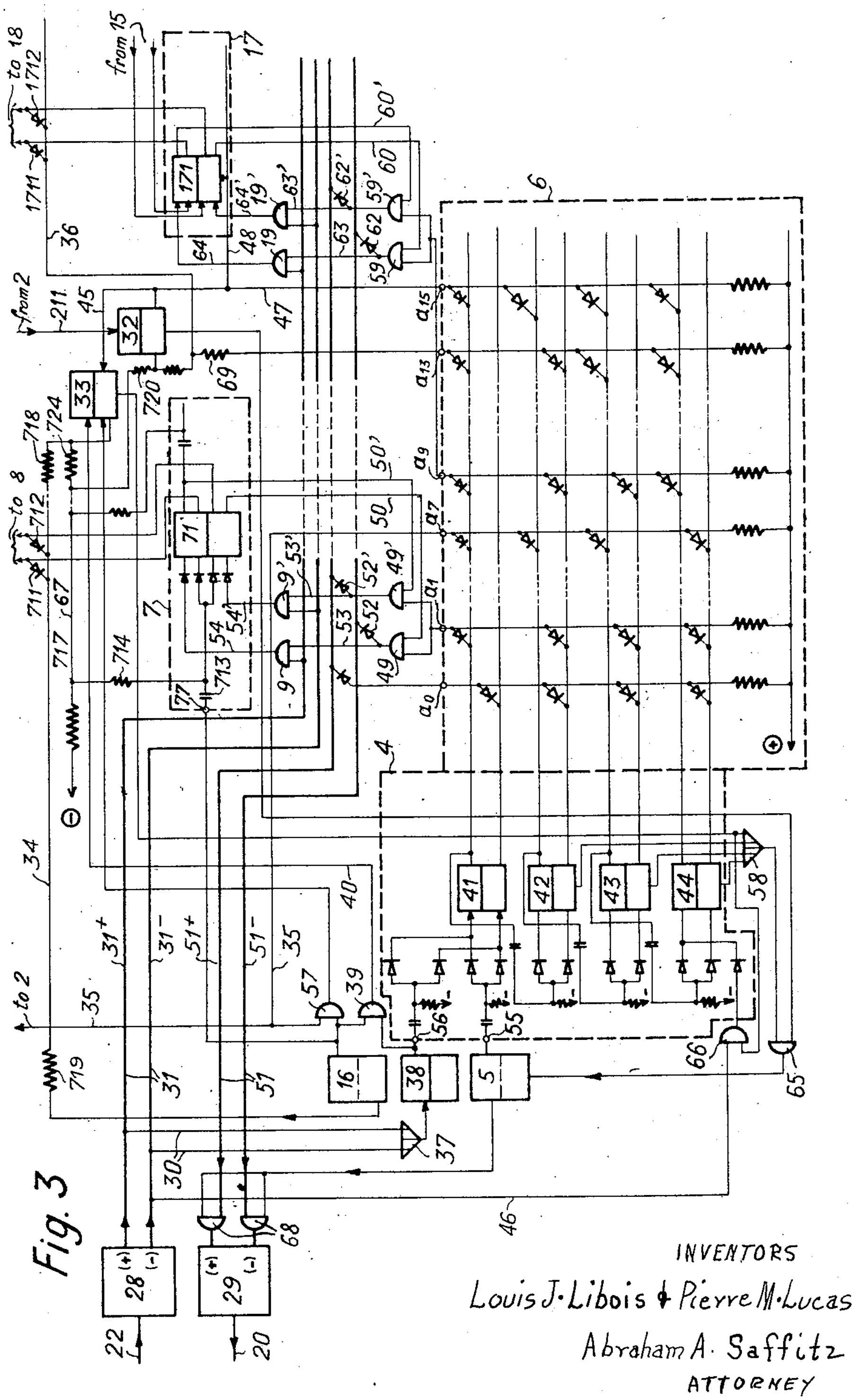

The control and test register and control and test decoder are shown in Figure 3.

The test register 4 includes four trigger circuits 41—44 which can store the digits 0–15 in binary form. The test decoder 6 is a decoding matrix of known type which causes signals appearing at the outputs $a_0$–$a_{15}$ to correspond with the different binary combinations of the trigger circuits 41–44.

In the case of a calling subscriber, the control and test register 4 is under the control of the generator 5. Pulses appear successively at the terminals $a_0$–$a_{15}$. Those pulses appearing at the terminals $a_1$–$a_6$ serve to test the condition of the trigger circuits 71–76 in the subscribers' register 7. Considering, for example, the case of the terminal $a_1$ associated with the trigger circuit 71 the pulse which appears at this terminal $a_1$ is sent through the lead 51$^-$ if the trigger circuit 71 is in its rest condition and through the lead 51$^+$ if the trigger circuit 71 is in its operated condition. If the trigger circuit 71 is in its rest condition, the gate circuit 49 of the "and" type is rendered conductive through the lead 50 and a pulse is applied to the lead 51$^-$ through the diode 52. If the trigger circuit 71 is in its operated condition, the gate circuit 49' of the "and" type is rendered conductive through the lead 50' and a pulse is applied to the lead 51$^+$ through the diode 52'. Thus, a pulse is obtained on one lead or the other according to the state of the tested trigger circuit; the condition of the other trigger circuits 72–76 is tested in the same manner.

Those pulses which appear at the terminals $a_9$–$a_{12}$ serve to test the condition of the trigger circuits 171–174 in the trunk register 17. The gate circuits 59 and 59' of the "and" type then play the part of the gate circuits 49 and 49; the conductors 60 and 60' take the part of the leads 50 and 50' and the diodes 62 and 62' take the place of the diodes 52 and 52'.

In the case of a called subscriber, the control and test register 4 is no longer under the control of the associated generator but is now under the control of the pulses arriving fom the central station through the conductors 22 and 30. Pulses appear at the terminals $a_1$–$a_6$ and serve not to test the condition of the trigger circuits 71–76, but to set these trigger circuits. Simultaneously the identification pulses of the called subscriber arrive either on the lead 31$^+$ if they are positive or on the lead 31$^-$ if they are negative. If the first pulse following the start pulse, which is intended to operate the trigger circuit 71, is positive and if this trigger circuit is in its rest condition, the gate circuit 49 is opened, the gate circuit 9 is also opened through the lead 53 and the trigger circuit is operated through the lead 54. If with the pulse following the start pulse still positive the trigger circuit 71 is in its operated condition, the gate circuit 49 is closed as is also the gate circuit 9 and the condition of the trigger circuit 71 is thus confirmed. If the pulse following the start pulse is negative, the trigger circuit 71 being in its rest condition, the gate circuit 49' is closed as is also the gate circuit 9' and the condition of the trigger circuit 71 is thus confirmed. Finally if the pulse following the start pulse is negative, the trigger circuit 71 being in its operated condition, the gate circuit 49' is conductive as is the gate circuit 9' and the trigger circuit is set to its rest condition through the lead 54'.

When a trunk line is disconnected, the test register 4 is still under the control of pulses arriving from the central station by way of the leads 22 and 30. These pulses appear at the terminals $a_9$–$a_{12}$ and they serve to set the trigger circuits 171–174. The coincidence or gate circuits 19 and 19' of the "and" type then take the place of the coincidence or gate circuits 9 and 9', the leads 63 and 63' take the place of the leads 53 and 53' and the leads 64 and 64' take the place of the leads 54 and 54'.

The trigger circuits 41–44 of the register 4 are arranged as a binary scaler without provision for inhibition of the counting function. The stepping of the scaler can be effected in two ways, either through the input 55 when the register is controlled by the generator 5 which is represented in Figure 3 as an a-stable self-oscillating trigger circuit, or by way of the input 56 through the pulse repeater 38. This repeater 38 is brought into operation when an identification pulse arrives by way of one or other of the leads 30 connected to the positive and negative terminals of the receiver 28 through the coincidence circuit 37 of the "or" type.

The trigger circuit 33 serves to cause the subscribers' register 7 to change from operation as a scaler to the inhibited condition, this inhibition being caused by the reception of an identification start pulse.

The trigger circuit 33 is operated through the gate circuit 39 of the "and" type when, with the generator 16 in operation, an identification pulse is received by the receiver 28 and leaves the repeater 38 (only the start element is effective).

The trigger circuit 33 is reset through the coincidence circuit 57 of the "and" type when, with the generator 16 in operation, the control and test decoder 6 is in position $a_7$, that is to say when there is a positive pulse on the connection 35 leading to the subscribers' gate circuit 2.

The trigger circuit 33 can also be set to its rest condition through the lead 47 coming from the output $a_{15}$ of the control and test decoder 6, which provides a pulse which sets to the rest condition not only the trigger circuit 33 but also the trigger circuit 32 and the trigger circuits 171–174 of the trunk register 17. The coincidence circuit 58 of the "or" type allows the following combination to be realized: trigger circuit 33 in its rest condition; or stage 42 of the test register 4 in its rest condition; or stage 43 of the test register 4 in its rest condition; or stage 44 of the test register 4 in its rest condition; that is to say the opposite of the combination: trigger circuit 33 in operational condition and control and test decoder in position $a_{14}$ or $a_{15}$.

The generator 5 can be stopped by the coincidence circuit 65 of the "and" type in the following conditions.

If the trigger circuit 32 is in rest condition and the coincidence circuit 58 of the "or" type provides the above-mentioned combination of the trigger circuit 33 in rest condition and one of the stages 42, 43, 44 of the test register in rest condition, the generator 5 is locked in its rest condition when a positive potential is transmitted by the "and" coincidence circuit 65. The generator 5 operates when it is not locked by the "and" coincidence circuit 65, that is to say in the following cases: either the trigger circuit 32 is in operation; or the combination of the trigger circuit 33 in operation and the control and test decoder 6 in position $a_{14}$ or $a_{15}$ is present.

When a negative start element is received by the receiver 28, the lead 31−, the lead 46 and the "and" coincidence circuit 66, it enables the control and test register 4 to cover in one step the first eight positions. The trigger circuit 44 is in fact directly excited and the control and test decoder marks directly the position $a_8$ (see the disconnection of a trunk line).

Figure 4:
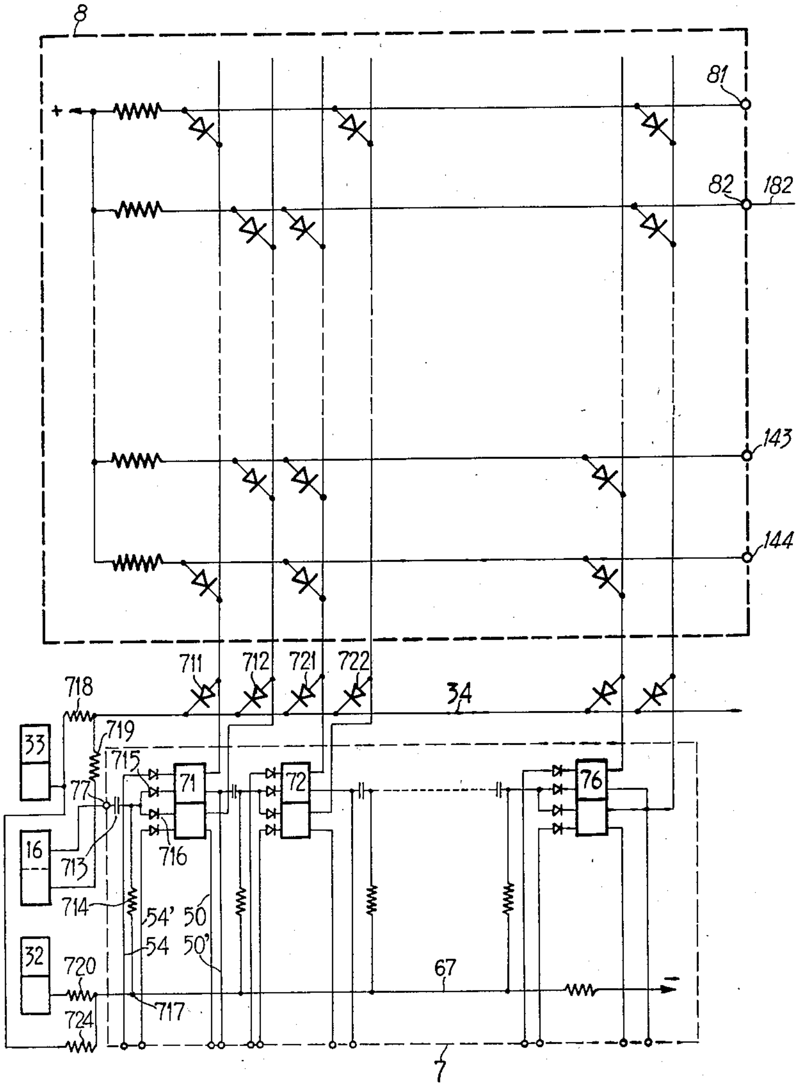
Figure 4 represents the subscribers' register and the subscribers' distributor.

Figure 4 represents the subscribers' register 7 and the subscribers' distributor 8.

The subscribers' register 7 include six trigger circuits 71–76. These trigger circuits can either operate as a binary scaler under the control of the generator 16 which is represented in the form of an a-stable trigger circuit, or can be inhibited at their input to enable the test decoder 6 to control and test their condition or to set them in accordance with the received identification signal or can be inhibited at their output.

The input for the scaling function is the input 77. When the trigger circuit 16 goes from its rest condition to its operated condition it produces a pulse which is differentiated by the unit consisting of the condenser 713 and the resistor 714. The differentiated pulse, which is positive, is transmitted through the diodes 715 and 716 to the two inputs of the trigger circuit 71. This pulse is effective only if the potential of the point 717 is sufficiently high, that is to say if the two trigger circuits 32 and 33, from the outputs of which this potential if formed, are both in the rest condition (during scanning the calls of calling subscribers).

The arrangement between two successive trigger circuits 71–76 of the subscribers' register 7 is the same as between the trigger circuit 16 and the first trigger circuit 71 of the register. All the points such as 717 are situated on a lead 67 the potential of which is fixed, by way of resistors 720 and 724, by the trigger circuits 32 and 33. If these trigger circuits are both in the rest condition the potential of 67 is high and the subscribers' distributor scans the subscribers' gate circuits. If at least one of the trigger circuits 32 and 33 is in the operated condition the value of the potential of the lead 67 is reduced to such an extent that the triggering pulses applied to the input 77 of the register are not effective. The input 77 is thus inhibited. The condition of the trigger circuits 71–76 can then be either tested by the control and test decoder 6 by way of leads such as 50—50′ or set by way of leads such as 54—54′.

The inhibition of the subscribers' distributor 8 which is a decoder takes place in the following manner:

If the trigger circuit 33 and the generator 16 are both in the rest condition, the lead 34 is raised to a high potential, through the resistors 718 and 719, by the two outputs of the said trigger circuit and generator, which are themselves at a high potential. All the diodes such as 711, 712, 721, 722 . . . connected on one side to the lead 34 and on the other to the vertical leads of the subscribers' register 8 are blocked. The subscribers' distributor distributes pulses at its output terminals 81 to 144.

If one or the other of the trigger circuit 33 and the generator 16 is in its operated condition, the potential of the lead 34 is negative and the outputs of the subscribers' register are inhibited. All the pulses appearing at the output of the trigger circuits are in effect short-circuited to the lead 34 by the diodes 711, 712, 721, 722 . . . through which passes the current pulse.

Figure 5:
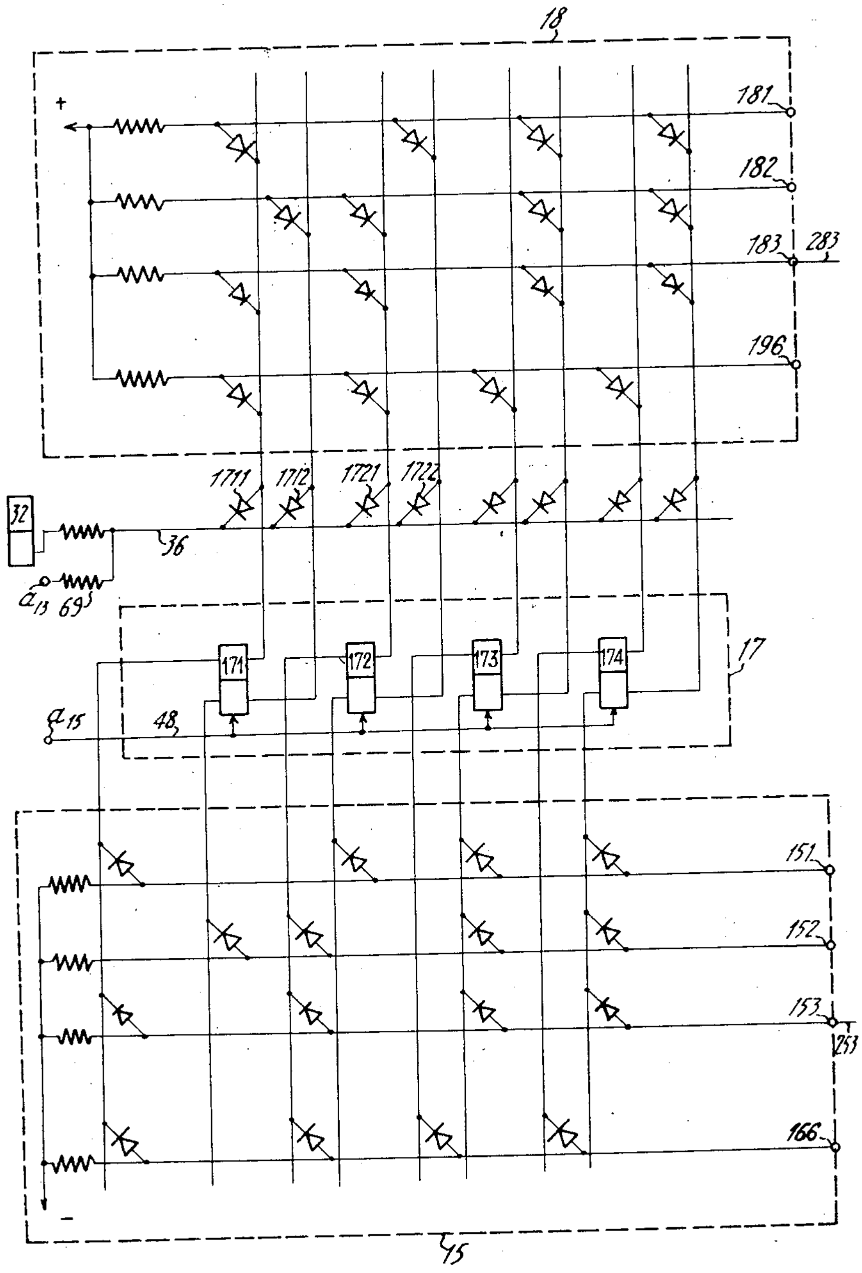
Figure 5 shows the trunk register and the associated coder and decoder.

Figure 5 shows the trunk register 17 associated with the trunk coder 15 and the trunk decoder 18.

As has been stated above, all the registers such as 4, 7 and 17 operate in the same way. In the case of the register 17, the inhibition is always effective except when the trigger circuit 32 is in its operated condition and the test decoder is in position $a_{13}$. A positive potential is then applied to the inhibition lead 36 to block all the diodes 1711, 1712, 1721, 1722 . . . This corresponds to the disconnection pulse sent by the control and test decoder in position $a_{13}$ to the trunk equipment 23 indicated by the trunk decoder 18.

When a line has just been connected, a connection control pulse arrives from the trunk equipment 23 on the lead 253. The said pulse passes through the diodes of the trunk coder 15 and operates one or more of the trigger circuits 171–174. The trunk register 17 thus records the identification signal of the trunk line which has been connected.

Figure 6:
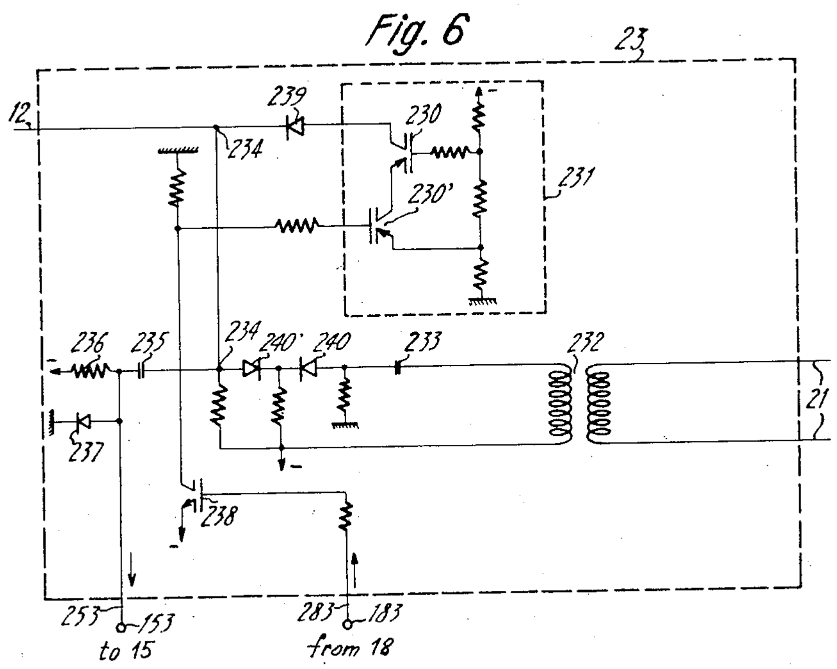
Figure 6 represents the trunk equipment.

Figure 6 shows the trunk equipment 23. This equipment is of known type but includes certain simplifications.

The lead 12 leaving the switchboard 10 is connected to one of the terminals of the primary winding of a transformer 232 the other terminal of which is grounded through a capacitor 233. The trunk 21 is connected to the terminals of the secondary winding of this transformer.

The firing of a crosspoint 13 of the switchboard 10 causes an increase in the potential of the point 234. This point is connected to a capacitor 235 and, by way of the resistor 236, to a point of fixed potential, and the pulse which results from the potential increase is differentiated by the circuit comprising the resistor 236 and the capacitor 235; one of the resulting pulses is shunted to ground through the diode 237 and the other is applied to the terminal 153 of the trunk coder through the lead 253.

The lead 283 from the terminal 183 of the trunk decoder terminates at a first transistor amplifier 238 which serves to drive the disconnection amplifier 231. The positive disconnection pulse received by the transistor 238 is converted by the latter into a negative pulse and by the disconnection amplifier 231 into a positive pulse of the necessary amplitude which is applied to the point 234 to cause breakdown or extinction of the crosspoint 13. The purpose of the diode 39 is to prevent the final transistor 230 of the amplifier 231 from being unblocked during the period of conversation. During this period the potential of the point 234 is actually greater than the potential of the base of the transistor 230, and without the presence of the diode 239, the speech channel would be shunted by the two transistors 230 and 230′ rendered conductive.

The diodes 240 and 240′ serve to ensure, when a crosspoint 13 has fired, that there will be a rapid increase of potential at the point 234, and also, in the case of a disconnection, to prevent the capacitor 233 from shunting a part of the disconnection signal. In the rest condition, the diode 240 is conductive and the diode 240′ is non-conductive. The capacitor 233 is charged to a certain voltage. At the instant of firing of a crosspoint, the potential of the point 234 increases again. When this increase in potential reaches a certain value, the diode 240′ is rendered conductive and the diode 240 rendered non-conductive because the charge on the capacitor 233 cannot change instantaneously. The potential of the point 234 stabilises at a certain value; then the capacitor 233 charges progressively and, at the end of a certain period (4 milliseconds for example) the diodes 240 and 240′ are both rendered conductive for speech currents or currents of loop frequency.

Figure 7:
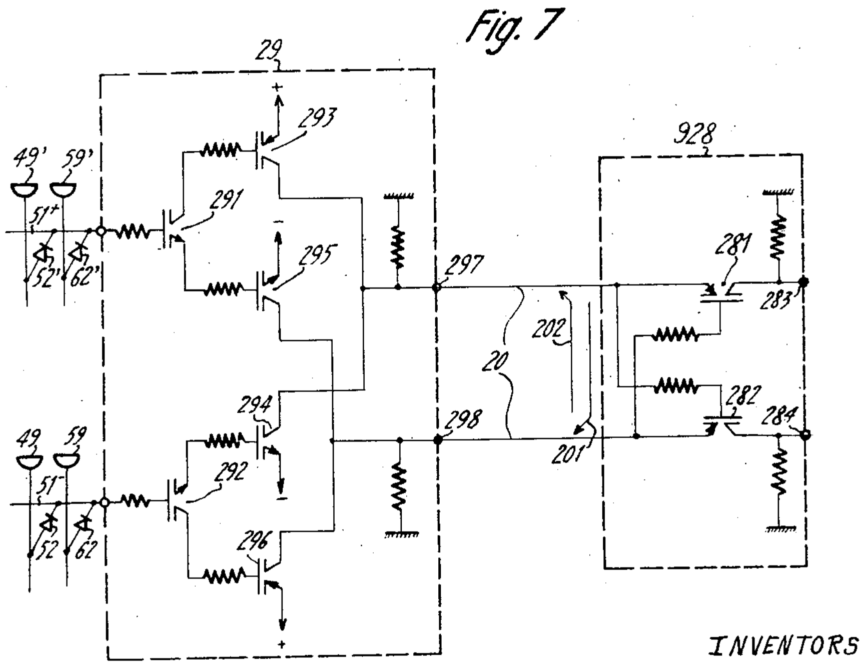
Figure 7 shows the code identification signal transmitter situated in the concentrator and the code identification signal receiver situated in the central station.
Figure 8:
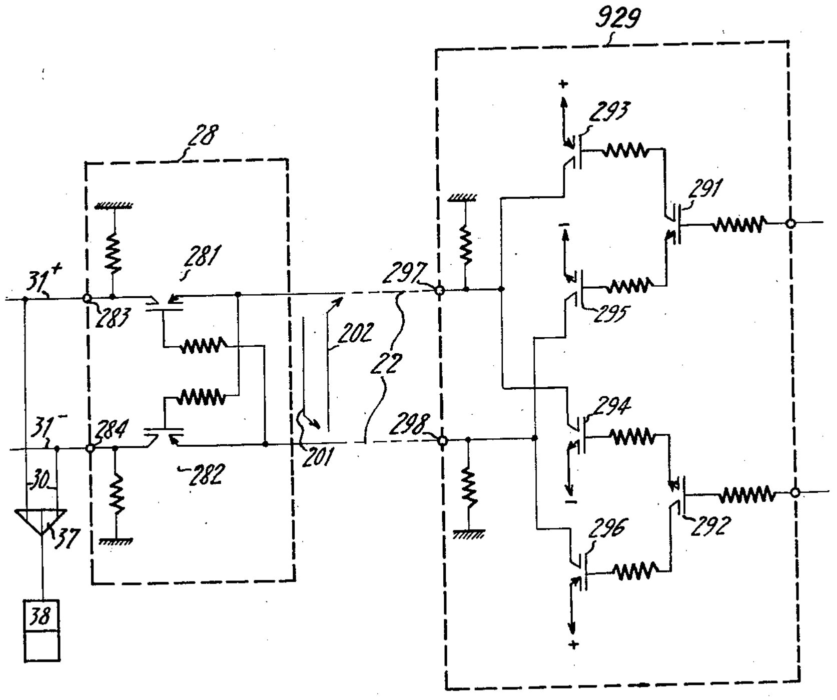
Figure 8 represents the code identification signal transmitter in the central station and the code identification signal receiver in the concentrator.

Figure 7 illustrates the identification signal sending device 29 on the concentrator side and the identification signal receiving device 928 on the central station side, and Figure 8 illustrates the identification signal sending device 929 on the central station side and the identification signal receiving device 28 on the concentrator side.

It should be noted that the pulses arriving by way of leads $51^+$ and $51^-$ are of the same polarity and that those arriving by way of the lead $51^+$ must provide in the signalling line 20 positive signals, represented by the direction of the arrow 201, and that those arriving by way of the lead $51^-$ must provide in the same line 20 negative signals, represented by the direction of the arrow 202. In a similar manner, positive signals represented by currents in the direction of the arrow 201 in the signalling line 22 (Figure 8) must provide pulses of a given polarity in lead $31^+$, and negative signals represented by currents in the direction of the arrow 202 in the same line 22 must provide pulses of the same polarity in the lead $31^-$.

The lead $51^+$ is connected to the base of a transistor 291 which controls two other transistors 293 and 295 of opposite kinds. When these two latter transistors become conductive, the potential of point 297 is increased and that of point 298 decreased. A positive current, in the direction of the arrow 201, is transmitted in the signalling line 20.

The lead $51^-$ is connected to the base of a transistor 292 which controls two other transistors 294 and 296 of opposite kinds. When these two latter transistors become conductive, the potential of the point 297 decreases and that of the point 298 increases. A negative current, in the direction of the arrow 202, is sent along the signalling line 20.

In the identification signal receiver 28 (Figure 8), the reference 281 indicates a transistor which amplifies the positive signals and provides positive pulses at the terminal 283, and the reference 282 indicates a transistor which amplifies the negative signals and provides positive pulses at the terminal 284.

In Figure 8, which represents the signalling connection through the line 22 in the direction from the central station to the concentrator, the references applied to similar members are the same as those in Figure 7.

Figure 9:
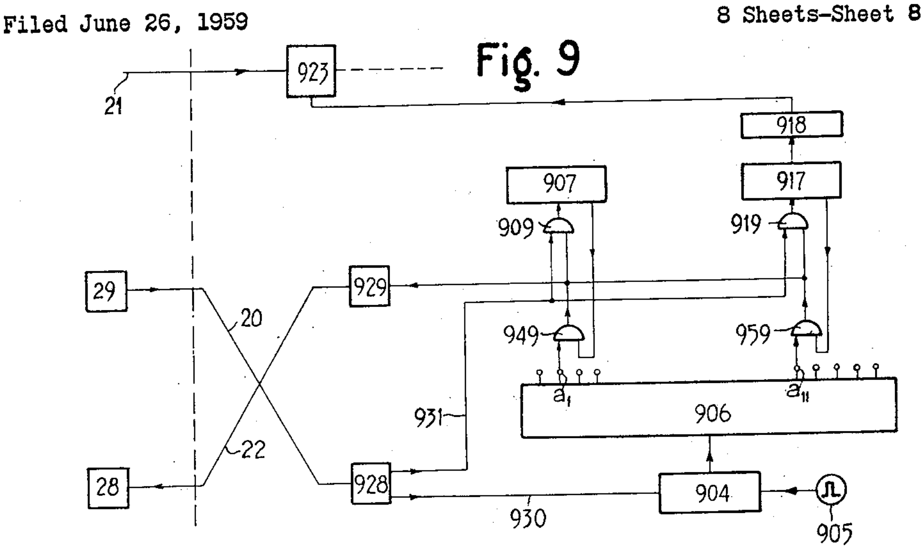
Figure 9 shows the code identification signal translator situated in the central station.

The identification signal translator at the central station is shown in Figure 9. It is very similar to the concentrator itself and the parts which are the same as those in Figure 1 are indicated in Figure 9 by reference numerals increased by 900. Thus there will be found the control and test register 904, its generator 905 and its associated decoder 906, the subscriber's register 907 and the trunk register 917 and its associated decoder 918. The subscribers' register 907 can, for example, be connected to subscribers' gate circuits arranged at the input leads of the central station in the same way as the subscribers' register 7 (Figure 1) is connected to the gate circuits 2.

The structure of the concentrator according to the invention having been fully described, its operation will now be explained and described.

CASE I.—REMOVAL OF HANDSET BY CALLING SUBSCRIBER

I. (1).—*Connection of the calling subscriber through the concentrator*

The loop of the subscriber 1 being closed as a result of the removal of his handset and the subscriber's line 3 being unconnected, the detector 203 detects the closing of the loop, as a result of which the "and" coincidence circuit 205 of the gate circuit 2 is rendered conductive. When the subscribers' register 7 and the subscribers' distributor 8, advancing under the control of the generator 16, arrive at the point 82 of the calling subscriber, the "and not" coincidence circuit 204, which is open owing to the absence of current in the resistor 202, allows the pulse arriving on the lead 182′ to pass and this pulse, amplified by the marking amplifier 209, energizes and fires a crosspoint 13 of the switchboard 10.

As a consequence of this crosspoint firing, the line 3, coupled to the incoming lead 11, is connected with an outgoing lead 12 of the switchboard 10. A current passes through the resistor 202 and the coincidence circuit 204 is inhibited by way of the lead 213. The calling subscriber's gate circuit is henceforth locked and becomes unsensitive to the pulses coming from the subscribers' distributor 8.

The firing of a diode 13 also causes an increase of potential at the point 234 (Figure 6) of the trunk equipment 23 corresponding to the fired diode. This increase of potential differentiated by the capacitor 235 and resistor 236, causes the transmission of a positive pulse over the lead 253, which pulse energises the input of the trunk coder 15 (Figure 1) and sets the four trigger circuits 171–174 of the trunk register 17 which identifies the connected trunk.

The trigger circuit 32 which, as already stated, is intended to mark the phase of the transmission of the identification signal to the central station which is connected to the output of the "or" coincidence circuit 207, is brought to its operated condition by way of the lead 211 which is connected in common to all the subscribers' gate circuits 2. The said trigger circuit 32 prepares the transmission of the calling subscriber's identification signal and that of the connected trunk.

I(2). *Identification of the calling subscriber*

The trigger circuit 32 being in its operated condition, the potential of the lead 67 (Figure 3) and that of the points 717 (Figure 4) is reduced and, as has already been explained, the pulses from the generator 16, which are intended to control the subscribers' register 7, become ineffective. The subscribers' register 7 stops counting and stores the number of the calling subscriber.

At the same time the blocking potential supplied by the trigger circuit 32 in its rest condition to the generator 5 by way of the "and" coincidence circuit 65 is removed. The generator 5 starts to oscillate and supplies counting pulses to the control and test register 4 which begins to seek the calling subscriber stored in the subscribers' register 7.

Each of the outputs $a_0$ to $a_{15}$ of the control and test decoder 6 receives in turn a positive pulse. The sending device 29, in the positions $a_0$ to $a_6$ inclusive, receives through the leads $51^+$ and $51^-$ pulses which arrive from one lead or the other according to the condition of the trigger circuits 71–76 of the subscribers' register. In the position $a_0$, the corresponding pulse arrives at the sending device 29 through the lead $51^+$, as seen in Figure 3.

The sending device 29 converts the pulses which it receives from the lead $51^+$ into positive pulses on the signalling line 20, and converts the pulses which it receives from the lead $51^-$ into negative pulses on this same signalling line. The calling subscriber's identification signal is thus a group of six identification pulses, preceded by a positive start pulse. It will be seen that the identification pulses arrive at the sending device 29 by way of the "and" coincidence circuits 68, which are conductive during the alternations of operation of the generator 5.

The pulse emitted by the control and test decoder on lead 35 (Figures 1 and 2) in the position $a_7$ remains ineffective, because the "and not" coincidence circuit 204 is blocked from the moment when the diode 13 operates.

It will later be seen how the calling subscriber's identification signal is received by the central station.

I(3) *Identification of the connected trunk*

In the positions $a_9$ to $a_{12}$ the control and test decoder tests the condition of the trigger circuits 171–174 of the trunk register 17 as it had previously tested the condition of the trigger circuits 71–76 of the subscribers' register 7. The pulse emitted by the control and test decoder on lead 36 (Figures 3 and 4) in the position $a_{13}$ remains ineffective because the trigger circuit 32 in its operated condition maintains the lead 36 at a low potential.

The pulse emitted by the control and test decoder on leads 47 and 48 in position $a_{15}$ serves to restore the trigger circuits 171–174 of the trunk register 17, as well as the trigger circuit 32, to the rest condition. The trigger circuit 32 being thus returned to its rest condition and the trigger circuit 33 being itself in the rest condition during the present phase, the generator 5 is blocked by the blocking potential provided by the trigger circuit 32 through the coincidence circuit 65. Being thus blocked the generator 5 restores to rest condition the test register 4 and this latter ceases to scan.

With the return of the trigger circuit 32 to rest condition, the potential of the lead 67 and of the points 717 is again raised. The subscribers' register 7 again becomes effective to operate as a scaler and this register again advances under the control of the generator 16.

The identification signal of the calling subscriber and that of the connected trunk are received and utilized at the central station in the following manner.

The identification signal receiver 928 at the central station receives the start signal, the identification signal of the calling subscriber which it applies to the subscribers' register 907 and the identification signal of the connected trunk which it applies to the trunk register 917. The operation of the registers 907 and 917 is completely analogous to that of the registers 7 and 17 when they record the subscriber identification signal and the trunk identification signal transmitted by the central station, which will be explained in the following Case II.

The identity of the calling subscriber which is given by the contents of the register 907 is stored until the instant when the called subscriber replies. This stored information is then used to effect the charging of the communication.

The identity of the trunk is given by the contents of the register 917, which is utilised, through the intermediary of the decoder 918, to ensure the marking of the corresponding incoming trunk equipment 923, which enables the central station to connect this incoming trunk equipment first to a conventional sender and then to the trunk of the called subscriber.

CASE II.—CONNECTION OF THE CALLED SUBSCRIBER

II(1). *Marking of the called subscriber's line*

The number of the called subscriber to be connected is introduced into the subscribers' register 907 by the central station. The manner in which this recording is carried out will not be explained in detail and it can be assumed that the lines from the central station include gate circuits of the same kind as the gate 2 connected to a subscribers' distributor of the same kind as the subscribers' distributor 8, which is itself connected to the subscriber's register 907.

Once the number of the called subscriber is stored, the control and test register 904 starts its scanning operation under the control of the generator 905 and the identification signal of this subscriber is sent by the sending device 929 over the signalling line 22 to the receiving device 28. As in Case I, this identification signal is a group of six identification pulses preceded by a positive start pulse.

The receiving device 28 sends the positive identification pulses along the lead 31+ and the negative pulses along the lead 31−. The pulse repeater 38 is brought into operation at each pulse, whatever the lead on which the said pulse appears.

As soon as the start pulse is received, the trigger circuit 33, which characterizes the phase of the identification signal reception of the central station is operated through the path (Figure 3): lead 30, "or" coincidence circuit 37, pulse repeater trigger circuit 38, "and" coincidence circuit 39, lead 40 and trigger circuit 33. The operation of the latter takes place only during the alternations of operation of the generator 16, owing to the coincidence circuit 39.

The "and" coincidence circuit 66 connected to the receiver 28 and to the trigger circuit 33 remains closed because the start pulse is not negative.

The trigger circuit 33 being in its operated condition, the potential of the lead 67 (Figure 3) and that of the points 717 (Figure 4) are reduced and in the same way as in Case I the pulses from the generator 16 intended for the control of the subscribers' register 7, become ineffective. The subscribers' register 7 then ceases to operate as a scaler. In addition the reduction of potential of the lead 34 (Figure 4) causes the unblocking of all the diodes 711, 712, 721, 722 . . . and the inhibition of all the outputs 81–144 of the subscribers' distributor 8.

The control and test register 4 advances in the manner of a scaler each time the pulse repeater 38 returns to its rest condition and positive pulses appear successively at the terminals $a_0$ to $a_6$. The generator 5 remains blocked during this advancement because the trigger circuit 32 characterizing the code transmission phases is in its rest condition and because a blocking potential is maintained at the generator 5 by way of the coincidence circuit 65.

In the positions $a_1$ to $a_6$, the trigger circuits 71–76 are set to the condition which corresponds to the sign of the corresponding identification pulse. Contrary to the operation in Case I the existing condition of the trigger circuits is not tested but instead they are made to take up a predetermined condition. For example, if the trigger circuit 71 is in its rest condition and if the first identification pulse is positive, the coincidence circuit 49 receives from the terminal $a_1$ a positive pulse and, from the lead 50, a positive potential. A positive pulse therefore leaves this coincidence circuit 49 and appears at the input of the coincidence circuit 9 at the moment when this latter receives a positive pulse from the lead 31+. A positive pulse therefore leaves this coincidence circuit 9 and sets the trigger circuit 71 to its operated condition. Of course, if the trigger circuit 71 had already been in operated condition, there would have been no positive potential on the lead 50, no positive pulse at the output of the coincidence circuits 49 and 9, and the trigger circuit 71 would have remained in its operated condition.

II(2). *Connection of the called subscriber through his concentrator*

At the end of the sixth received identification pulse, the pulse repeater 38 assumes the rest condition and the control and test decoder 6 passes to its position $a_7$. The positive pulse which appears at the terminal $a_7$ is applied on the one hand to the coincidence circuit 57 and on the other hand to the gate circuit 2, in both cases through the lead 35 (Figure 2).

The trigger circuit 33 is returned to the rest condition through the coincidence circuit 57 and during an alternation of operation of the generator 16, and this causes the termination of the inhibition of the outputs 81–144 of the subscribers' distributor 8.

The pulse coming from $a_7$ passes through the coincidence circuit 206 of the called subscriber's gate circuit, provided that the latter is not already connected. The coincidence circuit 204 is then conductive, because the subscribers' distributor 8, the outputs of which are no longer inhibited, is marking the lead 182′ at the moment in question. The pulse coming from the coincidence circuit 206 is amplified by the marking amplifier 209 and operates a diode 13 of the switchboard or matrix 10, thereby causing the connection of the called subscriber. It brings the trigger circuit 32 to its operated condition.

II(3). *Identification of the selected trunk*

At the end of the period II(2), the conditions of Case I are again existing, with the difference that the control and test decoder is in position $a_7$ instead of position $a_0$. The identification of the connected trunk is effected as in Case I. The trigger circuit 32 continues to inhibit the scaling of the subscribers' register 8. In addition, in assuming its operated condition, this trigger circuit removes the blocking potential applied to the generator 5 through the coincidence circuit 65, and the generator 5 commences to operate.

The control and test decoder advances no longer under the control of the pulses repeater 38, but under the control of the generator 5. As a result the identification signal of the connected trunk is transmitted in positions $a_9$ to $a_{12}$. The pulse transmitted on lead 36 (Figure 5) in position $a_{13}$ remains ineffective because the trigger circuit 32 is in operated condition. As in case I, the pulse transmitted in position $a_{15}$ restores to their rest conditions the trigger circuits 171–174, trigger circuit 32, generator 5 and control and test register 4, and causes the subscribers' register 7 to recommence operation as a scaler.

CASE III.—DISCONNECTION OF A TRUNK LINE

III(1). *Marking the trunk line to be disconnected*

The number of the trunk line to be disconnected is introduced into the trunk register 917 by the central station. Once the number of the trunk for disconnection has been stored, the control and test register 904 commences to scan under the control of the generator 905, but jumps its first eight positions $a_0$ to $a_7$. The identification signal of this trunk is transmitted by the scanning device 929 over the signalling line 22 to the receiving device 28. This identification signal is a group of four identification pulses preceded by a negative start pulse.

The receiving device 28 transmits the positive pulses over lead 31+ and the negative pulses over lead 31−. As soon as a negative start pulse is received, the trigger circuit 33, which characterizes the phases of reception of identification signals from the central station, is brought to its operated condition through the same channel as in case II and the "and" coincidence circuit 66 becomes conductive a short period before the trigger circuit 33 is set to its operated condition. The trigger circuit 44 of the control and test register is thus set directly to its operated condition, thereby causing the test decoder to pass directly to its position $a_8$.

The trigger circuit 33 being in its operated condition, the pulses from generator 16 for the control of the subscribers' register 7 become ineffective. The subscribers' register 7 stops operating as a scaler. In addition, all the outputs 81–144 of the subscribers' distributor 8 are inhibited.

Control and test register 4 advances in the manner of a scaler each time the pulse repeater 38 returns to rest condition and positive pulses appear successively at the terminals $a_8$ to $a_{15}$. As in Case II the generator 5 remains blocked during this advancement because the trigger circuit 32 characterizing the code transmission phases is in rest condition and because a blocking potential is maintained at the generator 5 through the coincidence circuit 65.

In positions $a_9$ to $a_{12}$, trigger circuits 171–174 are brought to the condition which corresponds to the sign of the corresponding identification pulse. For example, if the trigger circuit 171 is in rest condition and if the first identification pulse is positive, the coincidence circuit 59 receives a positive pulse from the terminal $a_9$ and a positive potential by way of the lead 60. A positive pulse is therefore produced by this coincidence circuit 59 and appears at the input of the coincidence circuit 19 at the moment when this latter receives a positive pulse through the lead 31+. This coincidence circuit 19 therefore produces a positive pulse and brings the trigger circuit 171 to its operated condition. Of course, if the trigger circuit 171 had already been in operated condition there would have been no positive potential on the lead 60, no positive pulse at the outputs of the coincidence circuits 59 and 19, and the trigger circuit 171 would have remained in operated condition.

III(2). *Disconnection of a marked trunk line*

At the end of the reception of fourth identification pulse, the pulse repeater 38 assumes its rest condition and the control and test decoder 6 goes to position $a_{13}$. The positive pulse which appears at the terminal $a_{13}$ (Figure 5) is effective in the present case, because the trigger circuit 32 is in rest condition. The inhibition of the trunk register 17 terminates and the positive pulse which appears at the terminal 183 is applied through the lead 283 to the trunk equipment 23 in which it causes the disconnection to be made. After passing through the transistor 238, which reverses the polarity of the pulse, the pulse is applied to the disconnection amplifier 231 which provides a positive output pulse of the required amplitude on the lead 12 of the switchboard or matrix 10, which results in the extinction of the corresponding diode 13 of the matrix.

In positions $a_{14}$ and $a_{15}$, advancement of the control and test register 4 is again caused by generator 5. The coincidence circuit 65 stops transmitting the blocking potential for the generator 5, which is provided by the trigger circuit 33, as long as the following situation exists: trigger circuit 33 in its operated condition and all trigger circuits 42, 43, 44 in operated condition, that is to say in positions $a_{14}$ and $a_{15}$ of Case III.

In position $a_{15}$ trigger circuits 171–174, trigger circuit 33 generator 5 and control and test register 4 are restored to rest condition and subscribers' register 7 resumes its operation as a scaler.

Finally, the possibilities of extending the invention will be considered. In particular the case of a concentrator having two stages of crosspoints will be discussed.

For a concentrator having one stage of crosspoints with *m* subscribers and *n* trunks, the number of crosspoints per subscriber is *n*. If *m* and *n* are large, it is advantageous to use a two-stage concentrator because the number of crosspoints per subscriber can be much lower than *n* for a given probability of blocking, and in addition the "ratio of concentration" *m*/*n* can be increased for a given blocking probability. This results in reducing the total number of trunks terminating at the central station and therefore also the number of crosspoints required inside the central station.

In the case of a two-stage concentrator, in general it can no longer be assumed that the crosspoint will select itself merely by marking the subscriber's side; but in accordance with the guiding principle of the independent connection concentrator, it is desirable to avoid requesting the central station to indicate before connection the trunk to be selected.

Figure 10:
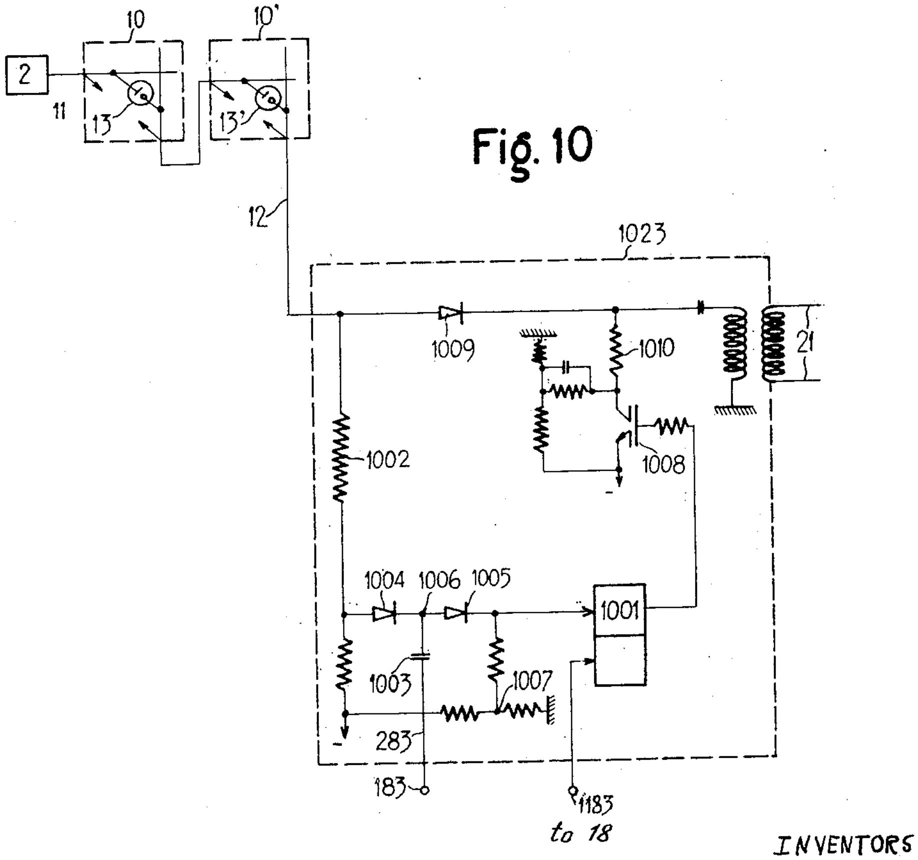
Figure 10 represents a modified trunk equipment suitable for a concentrator having two stages of crosspoints.

To control the connection in this case, it is sufficient to operate the register 17 as a scaler like the register 7, to cause it to advance in free scanning by means of the same generator 16 and to modify the trunk equipment 23. This trunk equipment becomes the equipment 1023 of Figure 10.

Instead of the register 17 receiving in one operation the identity of the selected line by way of the trunk coder 15, it is made to advance step by step while a very small marking current is maintained through all the available paths from the subscriber's line.

At each step the trunk register 17, now operating as a distributor, notes the presence or absence on the trunks of a potential characterizing the fact that the small marking current is present or is not present on this trunk, and therefore that it is suitable or unsuitable for establishing a path with the marked subscriber's line. As soon as a line having the small marking current is found, the advancement of the register 17 stops and a special trigger circuit 1001 in the trunk equipment 1023 is operated, and this serves to short-circuit the very high impedance which was until this time in series with the connection circuit and therefore to allow a normal current to flow through the selected path. From this moment the remainder of the operation is identical because the register 17 contains the number of the selected trunk. To disconnect the trunk, the register 17 actuates the same trigger circuit 1001 of the trunk equipment 1023 to restore it to rest condition, and this ensures the disconnection by restoring a very high impedance in the circuit.

When the marking of the line 11 is effected by the marking amplifier 209, all the diodes of the switchboards 10, 10', . . . and all the lines 12 are loaded by the very high resistor 1002. The current flow, which is very small (for example, 50 microamperes), charges the capacitor 1003 through the diode 1004, the charging period being, for example, 100 microseconds. All the capacitors 1003 of the equipments 1023 which can be utilized to connect the trunk 11, and only these, are therefore charged. If a positive pulse of 5 volts, for example, is applied to the output 183 of the trunk register 17, this pulse will suffice to unblock the diode 1005 and to drive the trigger circuit 1001 to its operated condition. If the capacitor 1003 is charged, the potential of point 1006 is very slightly less than that of point 1007 which is itself at 5 volts positive with respect to the negative terminal of the battery.

If on the contrary the capacitor 1003 is not charged, the point 1006 is practically at the potential of the negative terminal of the battery and the pulse will not be sufficient to unblock the diode 1005.

When the trigger circuit 1001 is in operated condition it permits the operation of the short-circuiting transistor 1008. The nominal flow of the diodes of the switchboard 10, 10' . . . (for example 10 milliamperes) is then provided through the diode 1009, the resistance 1010 and transistor 1008, a circuit the impedance of which is much less than the resistance 1002.

When the trunk is to be disconnected (extinction of the diodes of switchboards 10, 10' . . . ) it is only necessary to return the trigger circuit 1001 to rest condition through the output 1183 of the trunk register 17. This blocks the transistor 1008. The diodes are then again in series with the very high resistor 1002, but, owing to the fact that there is no longer any marking by the marking amplifier 209 on line 11, they cannot continue in operated condition and are extinguished.

It has been assumed that in the case of the concentrator with two stages of crosspoints, the trunk decoder 18 had two outputs 183 and 1183 per trunk equipment 1023, one pertaining to the scanning of the connected trunks or more accurately the trunks capable of being connected and to the selection of these trunks, and the other pertaining to the disconnection. It could also be arranged that all the terminals 1183 and all the trunk equipment circuits 1023 were connected in parallel to the lead 36 connected to the terminal $a_{13}$ of the test decoder, the trigger circuit 1001 being then driven through an "and" coincidence circuit similar to the coincidence circuit 206 of Figure 2 by pulses arriving simultaneously at the terminals 183 and 1183.

Although the invention has been described in detail in connection with specific examples of electric circuits, it will be understood that numerous variations obvious to a man skilled in the art are possible and that these variations are within the scope of the invention.

What we claim is:

1. In a telephone system, a central office; a plurality of lines; a plurality of trunks less in number than said plurality of lines and connected to said central office; and an independent connection line concentrator for establishing connections from any one of said lines to a random selected idle one of said trunks and comprising first and second auxiliary lines, subscriber gates responsive to the service condition of the subscriber lines, trunk circuits responsive to the connection condition of the trunks, a crosspoint matrix having lines and columns respectively connected to said subscriber gates and trunk circuits, a subscriber register means adapted both to free run for scanning said subscriber gates and to store a given subscriber identification number, a trunk register means adapted to store a given trunk identification number and a control and test register means adapted both to free run for serially applying the digits stored in said subscriber and trunk register means to said auxiliary line and to be controlled by said central office for serially applying the digits of the identification number of a called subscriber and of a trunk to be disconnected conveyed by said second auxiliary line to said subscriber and trunk register means.

2. In a telephone system, a central office; a plurality of lines; a plurality of trunks less in number than said plurality of lines and connected to said central office; and an independent connection line concentrator for establishing connections from any one of said lines to a random selected idle one of said trunks and comprising in combination a first auxiliary line adapted to convey from said concentrator to said central office serial code signals representative of the numbers of calling subscriber lines and of the connected trunks, a second auxiliary line adapted to convey from said central office to said concentrator serial code signals representative of the numbers of called subscriber lines and of the trunks to be disconnected, subscriber gates responsive to the service condition of the subscriber lines, trunk circuits responsive to the connection condition of the trunks, a crosspoint matrix having lines and columns respectively connected to said subscriber gates and trunk circuits, a subscriber register means having first terminals connected to said subscriber gates and second terminals connected both to said first and second auxiliary lines, said subscriber register means being adapted both to free run for scanning its first terminals and to store a given number on its second terminals, a trunk register means having first terminals connected to said trunk circuits and second terminals connected both to said first and second auxiliary lines, said trunk register means being adapted to store a given number on its first and second terminals, and a control register means having terminals connected to said subscriber register means and trunk register means which is adapted both to free run for scanning its terminals and to serially apply the digits of the number stored on the second terminals of the subscriber register means and on the second terminals of the trunk register means to said first auxiliary lines and to be controlled by said central office and serially apply the digits of the number conveyed by said second auxiliary line to said subscriber and trunk register means.

3. In a telephone system, a central office; a plurality of lines; a plurality of trunks less in number than said plurality of lines and connected to said central office;

and an independent connection line concentrator for establishing connections from any one of said lines to a random selected idle one of said trunks and comprising in combination a first auxiliary line adapted to convey from said concentrator to said central office serial code signals representative of the numbers of calling subscriber lines and of the connected trunks, a second auxiliary line adapted to convey from said central office to said concentrator serial code signals representative of the numbers of called subscriber lines and of the trunks to be disconnected, subscriber gates responsive to the service condition of the subscriber lines, trunk circuits responsive to the connection condition of the trunks, a crosspoint matrix having lines and columns respectively connected to said subscriber gates and trunk circuits, a subscriber register constituted by a number of trigger circuits adapted for registering the numbers of the subscriber lines connected to said concentrator and comprising, for each trigger circuit, auxiliary gates, two test and positioning terminals connected in parallel through said auxiliary gates to said first and second auxiliary lines and an output, a binary to decimal decoder having binary inputs and decimal outputs the inputs of which are connected to the outputs of said subscriber register and the outputs of which are connected to said subscriber gates, and a free running oscillator adapted to drive said subscriber register for scanning said subscriber gates until the subscriber register is stopped in the position corresponding to a calling subscriber line, thereby storing its number and operating its connection at random with an idle trunk, a trunk register means having first terminals connected to said trunk circuits and second terminals connected both to said first and second auxiliary lines, said trunk register means being adapted to store a given number on its first and second terminals, and a control register means having terminals connected to said subscriber register and trunk register means adapted both to free run for scanning its terminals and serially apply the digits of the number stored in said subscriber register and on the second terminals of the trunk register means to said first auxiliary lines and to be controlled by said central office and serially apply the digits of the number conveyed by said second auxiliary line to said subscriber register and trunk register means.

4. In a telephone system, a central office; a plurality of lines; a plurality of trunks less in number than said plurality of lines and connected to said central office; and an independent connection line concentrator for establishing connections from any one of said lines to a random selected idle one of said trunks and comprising in combination a first auxiliary line adapted to convey from said concentrator to said central office serial code signals representative of the numbers of calling subscriber lines and of the connected trunks, a second auxiliary line adapted to convey from said central office to said concentrator serial code signals representative of the numbers of called subscriber lines and of the trunks to be disconnected, subscriber gates responsive to the service condition of the subscriber lines, trunk circuits responsive to the connection condition of the trunks, a crosspoint matrix having lines and columns respectively connected to said subscriber gates and trunk circuits, a subscriber register means having first terminals connected to said subscriber gates and second terminals connected both to said first and second auxiliary lines, said subscriber register means being adapted both to free run for scanning its first terminals and to store a given number on its second terminals, a trunk register constituted by a number of trigger circuits adapted for registering the numbers of the trunks connecting said concentrator to said central office and comprising a resetting input and for each trigger circuit auxiliary gates, two test and positioning terminals connected in parallel through said auxiliary gates to said first and second auxiliary lines, a positioning input and an output, a decimal to binary coder having decimal inputs and binary outputs the inputs of which are connected to said trunk circuits and the outputs of which are connected to said positioning inputs of said trunk register, a binary to decimal decoder having a general disconnection input, binary inputs and decimal outputs, the binary inputs of which are connected to the outputs of said trunk register and the outputs of which are connected to said trunk circuits, and a control register means having terminals connected to said subscriber register means and trunk register adapted both to free run for scanning its terminals and serially apply the digits of the number stored on the second terminals of the subscriber register means and in the trunk register to said first auxiliary lines and to be controlled by said central office and serially apply the digits of the number conveyed by said second auxiliary line to said subscriber register means and trunk register.

5. In a telephone system, a central office; a plurality of lines; a plurality of trunks less in number than said plurality of lines and connected to said central office; and an independent connection line concentrator for establishing connections from any one of said lines to a random selected idle one of said trunks and comprising in combination a first auxiliary line adapted to convey from said concentrator to said central office serial code signals representative of the numbers of calling subscriber lines and of the connected trunks, a second auxiliary line adapted to convey from said central office to said concentrator serial code signals representative of the numbers of called subscriber lines and of the trunks to be disconnected, subscriber gates responsive to the service condition of the subscriber lines, trunk circuits responsive to the connection condition of the trunks, a crosspoint matrix having lines and columns respectively connected to said subscriber gates and trunk circuits, first and second auxiliary gates, a subscriber register means having first terminals connected to said subscriber gates and second terminals connected both through said first auxiliary gates to said first and second auxiliary lines, said subscriber register means being adapted both to free run for scanning its first terminals and to store a given number on its second terminals, a trunk register means having first terminals connected to said trunk circuits and second terminals connected both through said second auxiliary gates to said first and second auxiliary lines said trunk register means being adapted to store a given number on its first and second terminals, a binary to decimal control decoder having binary inputs and decimal outputs, these decimal outputs being connected respectively through said first and second auxiliary lines to said second terminals of said subscriber and trunk register means, to said first terminals of said trunk register means and to said subscriber gates in parallel, and a control register having outputs connected to said binary inputs, comprising a free running oscillator and having an input connected to said second auxiliary line, said control register being adapted both to free run for scanning said decimal outputs of said control decoder, thereby providing the transmission onto said first auxiliary line of the numbers of a calling subscriber line registered in said subscriber register means and of a connected trunk registered in said trunk register means and to be controlled by said central office through said second auxiliary line for positioning said subscriber and trunk register means respectively according to the numbers of a called subscriber line and of a given trunk to be disconnected, and for transmitting to said subscriber gates a pulse operating the connection of a called subscriber line with an idle trunk and to said first terminals of said trunk register means a pulse operating the disconnection of said given trunk.

References Cited in the file of this patent

UNITED STATES PATENTS

| | | |
|---|---|---|
| 2,853,555 | Abbott et al. | Sept. 23, 1958 |
| 2,894,072 | Abbott et al. | July 7, 1959 |